US006832153B2

(12) United States Patent
Thayer et al.

(10) Patent No.: US 6,832,153 B2
(45) Date of Patent: Dec. 14, 2004

(54) METHOD AND APPARATUS FOR PROVIDING INFORMATION PERTAINING TO VEHICLES LOCATED ALONG A PREDETERMINED TRAVEL ROUTE

(75) Inventors: Peter A. Thayer, Mountain View, CA (US); Alexander Babichev, Fremont, CA (US); Milind M. Dange, Milpitas, CA (US); Subramanian Mahesh, Foster City, CA (US)

(73) Assignee: MobileAria, Mountain View, CA (US)

( * ) Notice: Subject to any disclaimer, the term of this patent is extended or adjusted under 35 U.S.C. 154(b) by 0 days.

(21) Appl. No.: 10/306,679

(22) Filed: Nov. 27, 2002

(65) Prior Publication Data

US 2004/0102896 A1 May 27, 2004

(51) Int. Cl.[7] ................................................ G01C 21/00

(52) U.S. Cl. ......................... 701/207; 701/14; 701/210; 701/300; 340/988; 340/989; 244/175

(58) Field of Search ............................. 701/3, 14, 207, 701/210, 300; 340/988, 989; 244/175

(56) References Cited

U.S. PATENT DOCUMENTS 3,875,379 A * 4/1975 Vietor ........................ 701/121
3,947,809 A * 3/1976 Bateman ..................... 340/970
4,792,906 A * 12/1988 King et al. .................... 701/5
5,526,000 A * 6/1996 Chazelle et al. ............ 342/407
5,648,768 A 7/1997 Bouve
5,825,283 A * 10/1998 Camhi ........................ 340/438
5,867,804 A * 2/1999 Pilley et al. ................ 701/120
5,922,040 A * 7/1999 Prabhakaran ............... 701/117
5,949,345 A 9/1999 Beckert et al.
5,999,882 A 12/1999 Simpson et al.
6,073,075 A 6/2000 Kondou et al.
6,209,026 B1 3/2001 Ran et al.
6,317,686 B1 11/2001 Ran
6,339,745 B1 * 1/2002 Novik ........................ 701/208
6,347,263 B1 2/2002 Johnson et al. ............... 701/14
6,353,398 B1 3/2002 Amin et al.
6,654,689 B1 11/2003 Kelly et al.
2001/0020213 A1 9/2001 Hatano
2002/0121989 A1 9/2002 Burns
2002/0143461 A1 10/2002 Burns et al. ................ 701/117

FOREIGN PATENT DOCUMENTS

GB 2227389 A * 7/1990 .......... G01S/13/91

* cited by examiner

*Primary Examiner*—Thomas G. Black
*Assistant Examiner*—Eric M. Gibson
(74) *Attorney, Agent, or Firm*—Thelen Reid & Priest, LLP

(57) ABSTRACT

A system for tracking a fleet of vehicles, such as trucks or aircraft, includes a set of vehicle processing systems associated with each vehicle. Each vehicle processing system receives a travel route matrix from a remote server, and generates periodic vehicle position information which is compared with a propagating wave associated with different segments, or corridors, of the matrix. When the vehicle position is determined to lie outside the propagating wave and a geo-corridor at a particular point in time, alerts are sent to the server notifying the server of same. Corrective action can then be taken, such as remotely disabling the vehicle, or alerting a fleet manager.

31 Claims, 8 Drawing Sheets

METHOD AND APPARATUS FOR PROVIDING INFORMATION PERTAINING TO VEHICLES LOCATED ALONG A PREDETERMINED TRAVEL ROUTE

CROSS-REFERENCE TO RELATED APPLICATIONS (Not applicable)

BACKGROUND OF THE INVENTION

1. Field of the Invention

The invention relates to vehicle tracking, vehicle security, and load security, and more specifically, to a method and apparatus for tracking vehicles in an efficient and cost-effective manner.

2. Description of Related Art

Automatic vehicle location (AVL) methods are well known in the art, and are used to insure safety and reliability of vehicle traffic, for example by trucking fleet companies. One known method of AVL involves a periodic communications uplink from the vehicle to a remote host server, through which uplink the vehicle notifies the remote server of its current position. Such periodic uplinking and notification is communication intensive, particularly when large numbers of vehicles are involved, and particularly when, as is customary, satellite communications are involved.

A conventional method for vehicle and load security, referred to as Geo-Fencing, involves equipping a processor onboard a vehicle with information describing a prescribed geographic zone, or fence. Depending on the particular configuration, the vehicle processor will notify a remote dispatcher when the vehicle has either left an inclusion zone, or entered an exclusion zone. In response, the dispatcher can remotely shut down vehicle operation, preventing further deviation from the prescribed "fence." Alternatively, public security authorities can be notified. This method is particularly attractive for hazardous material carriers, or carriers of high value goods vulnerable to theft. However, it is also communication intensive, and may not be as precise as required, for as long as the vehicle is within the zone, no fault is detected, regardless of which part of the zone the vehicle is in. For instance, a vehicle which has remained at the same location for a protracted period of time would not set off any alarms as long as it has not left the geographic fence. Such a vehicle, however, could conceivable be in trouble—for example, hijacked, or detained for other mischief. Thus there is a long felt need, underscored by current terrorist threats, to provide more accurate tracking of vehicles, in an efficient and cost-effective manner.

BRIEF SUMMARY OF THE INVENTION

In accordance with the invention, a method for providing information regarding the location of a vehicle relative to a travel route includes defining a zone whose location varies in time relative to the travel route, determining the location of the vehicle at multiple points in time, determining the relationship of one or more determined vehicle locations to the zone, and generating a notification signal when the determined relationship indicates that a vehicle location is outside the zone.

Further in accordance with the invention, a system for providing information regarding the location of a vehicle relative to a travel route includes a server for generating a matrix associated with the travel route, and a processing system, remote from the server, for generating position information and for comparing the position information with the position of a zone whose location varies over time, the processing device forwarding an alert to the server when the position information indicates that the position of the first processing system is outside the zone.

Further in accordance with the invention, a system for tracking one or more fleets of vehicles each having one or more vehicles includes at least one server for generating a geo-matrix associated with each route set, and a set of vehicle processing systems associated with each vehicle, each vehicle processing system being disposed in a vehicle of the fleet and generating position information regarding the position of said vehicle at predetermined time intervals relative to a propagating zone defined by the geo-matrix associated with the fleet, the vehicle processing system notifying the server when the vehicle is determined to lie outside a geographical region associated with the propagating zone.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements.

DETAILED DESCRIPTION OF THE INVENTION

Figure 1:
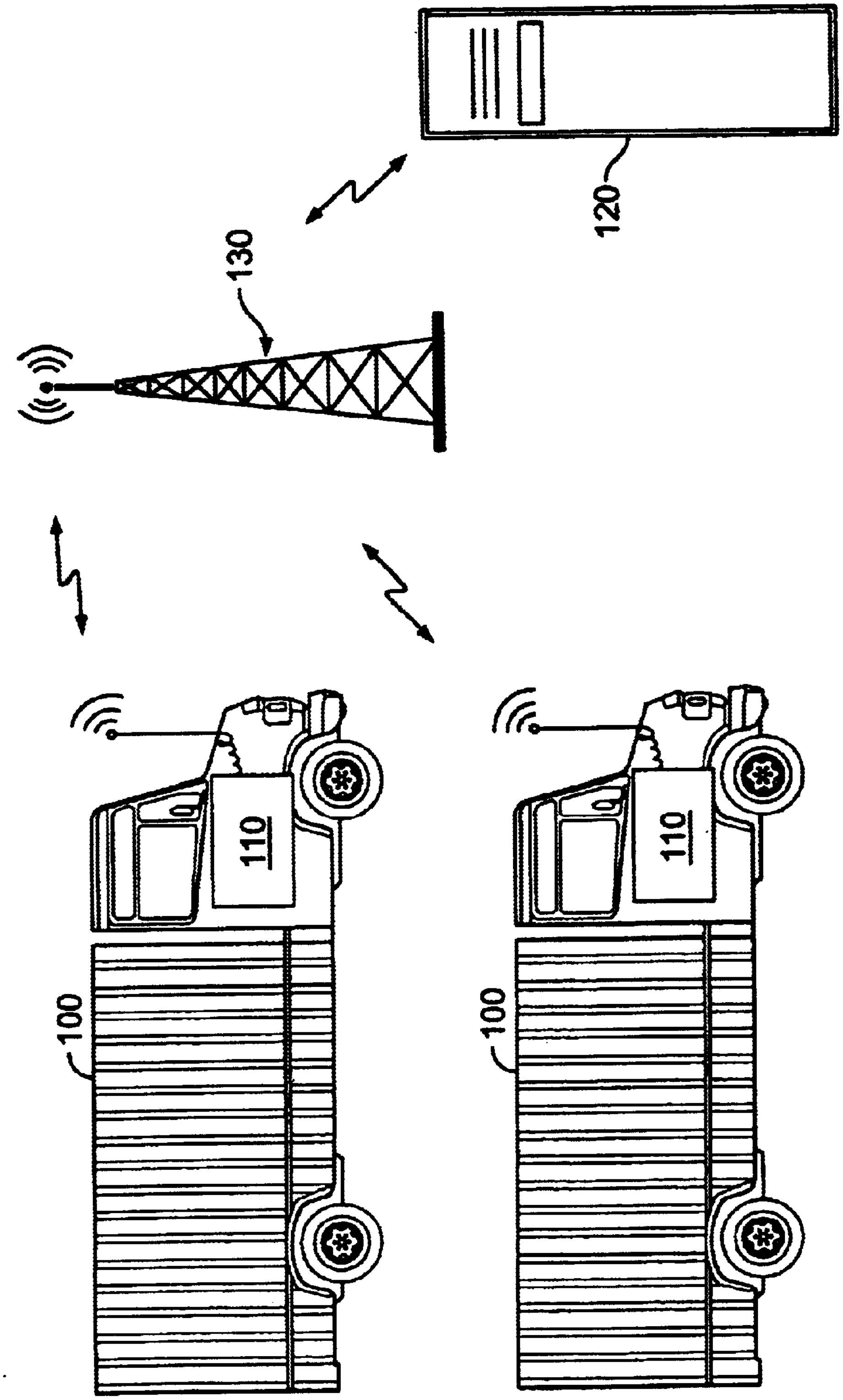
FIG. 1 is a schematic diagram of a fleet of vehicles in accordance with the invention.

FIG. 1 is a schematic illustration of an exemplary system for providing information pertaining to vehicles located along a predetermined travel route in accordance with the invention. A plurality of vehicles 100, for example trucks of a trucking fleet, each contain a vehicle processing system (VPS) 110 capable of communicating with a remote server 120, for example via cellular network 130 in a known manner. Other known communications methods fall within the purview of the invention.

Figure 2:
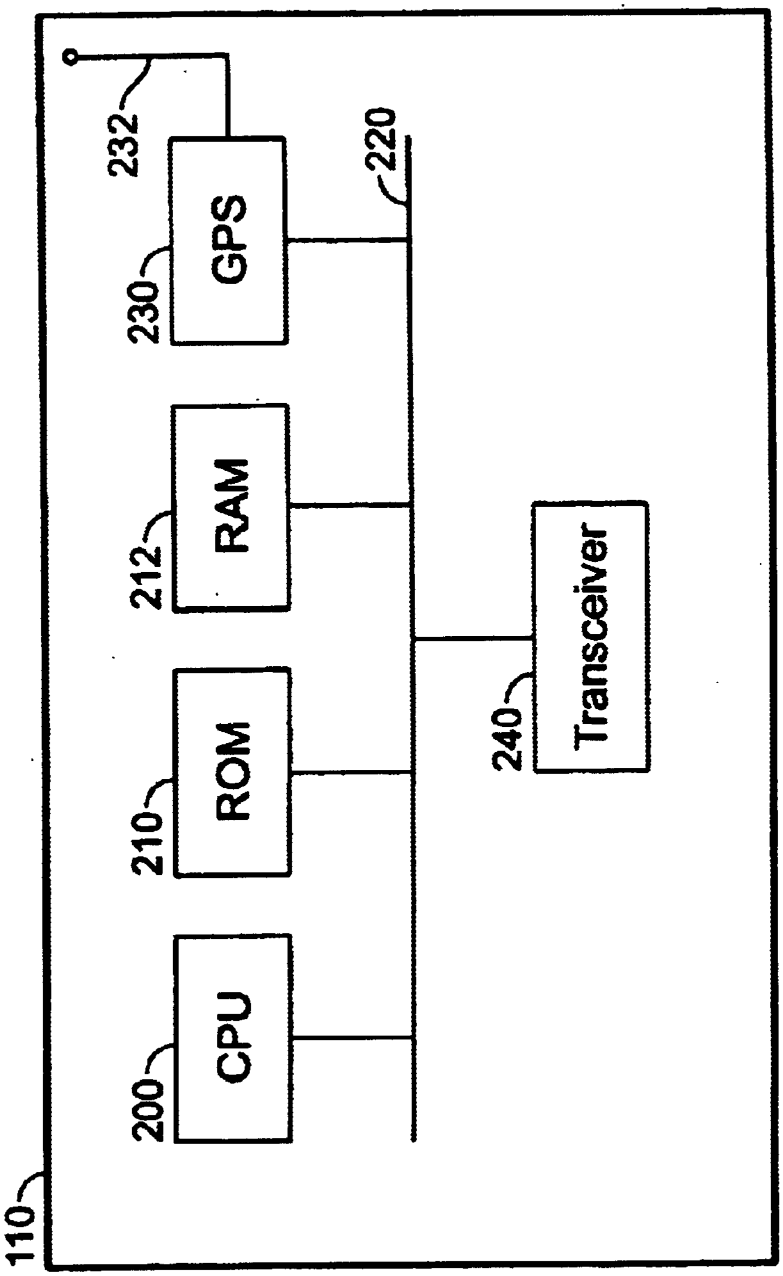
FIG. 2 is a block diagram of a vehicle processing system.

FIG. 2 illustrates a vehicle processing system 110 in more detail, wherein the processing system is shown to contain a central processing unit (CPU) 200, storage devices 210 and 212, which are for example RAM and ROM devices, a data transmission bus 220, and a position determining device 230, such as a GPS (global positioning system) with associated antenna 232. Vehicle processing system 110 also contains data transceiver 240 for transmitting and receiving information to and from remote server 120 via cellular network 130 (FIG. 1). Vehicle processing system 110 and remote server 120 cooperate to insure that vehicle 100 maintains a predetermined travel path and schedule, within prescribed constraints and parameters, as explained in greater detail below.

Figure 3:
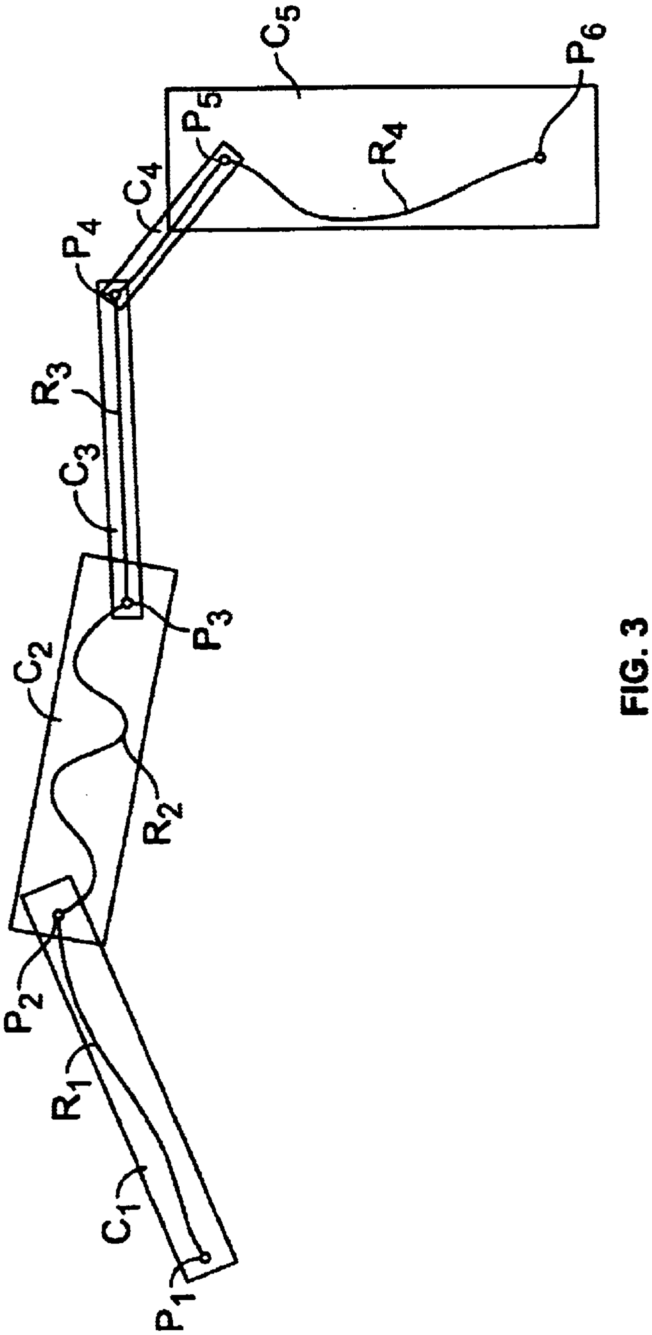
FIG. 3 is a schematic diagram of a geo-wave matrix.

FIG. 3 diagrammatically illustrates some principles governing the operation of the system of the invention. It will be appreciated that the invention involves manipulations of information and data which are representationally depicted, for facilitating conceptualization and discussion, in FIG. 3. Thus a vehicle, such as vehicle 100 above, is represented as having associated therewith a predetermined travel route between two points, $P_1$ and $P_6$, and passing through intermediate points $P_2$–$P_5$. Generally, individual points along a travel route are designated as $P_n$. The travel route of FIG. 3 is along four roads: Road $R_1$; Road $R_2$; Road $R_3$; and Road $R_4$.

Superimposed over the travel route in FIG. 3 are five rectangular segments, herein referred to as geo-wave corridors, and demarcated $C_1$–$C_5$. Each geo-wave corridor $C_n$ corresponds to a geographical region encompassing a portion of the travel route, and represents the geographical region within which the vehicle 100 is desirably constrained during its motion between two points $P_i$ and $P_{i+1}$. For example, in FIG. 3, geo-wave corridor $C_n$ extends between end points $P_1$ and $P_2$, geo-wave corridor $C_2$ extends between end points $P_2$ and $P_3$, and so on.

Each geo-wave corridor $C_n$ is electronically represented by a data set stored in both vehicle processing system 110 and remote server 120. The data set associated with the geo-wave corridor $C_n$ is established based on latitude and longitude coordinates of the end points $P_i$, $P_{i+1}$ of the geo-wave corridor. For example, for geo-wave corridor $C_2$, the data set is established based on the latitude and longitude coordinates of end points $P_2$ and $P_3$; the variance of the route as deviation from a straight line; and the tolerance or precision to be maintained relative to the roadway as permitted distance the vehicle is allowed to travel from the route. The latitude and longitude coordinates of the end points associated with the geo-wave corridors $C_n$ can be obtained in any known manner, for example using a mapping database as discussed in greater detail below.

In the preferred embodiment, generation and storage of the data set corresponding to a geo-wave corridor $C_n$ takes place in the remote server 120, although it is possible that one or both of these functions can be carried out by the vehicle processing system 110, or by a different device (not shown) from which the data set can then be downloaded into remote server 120 and/or vehicle processing system 110. The total number of geo-wave corridors $C_n$, and the width of each corridor, are preferably determined by the remote server 120, with the multiple data sets corresponding to the geo-wave corridors $C_n$ being collectively referred to herein as the geo-wave matrix of the travel route. The number of geo-wave corridors $C_n$, and corresponding data sets, which are established depends on several factors, including road variations (curviness) and computational, or vehicle processing, resources to be dedicated for that purpose, and the granularity or tolerance of the route that is selected. For example, in a city with Haz Mat, the corridor may be selected to be 50 meters wide, whereas in mountain routes a 10-mile width may be sufficient. Generally, it is desirable to make each geo-wave corridor $C_n$ as narrow as possible in width, which will generally increase the number of geo-wave corridors, especially when the travel route entails many directional variations. It will be appreciated that the use of non-rectangular geo-wave corridors may be desirable in some situations to reduce the size of the geo-wave matrix and/or optimize other parameters. It is also possible to use three-dimensional geo-wave corridors, which would be associated with airborne vehicles. Such three-dimensional applications entail the use of a third variable relating to altitude, in addition to latitude and longitude. Speed would for example be determined as speed along the plane of the earth and rate of climb.

Figure 4:
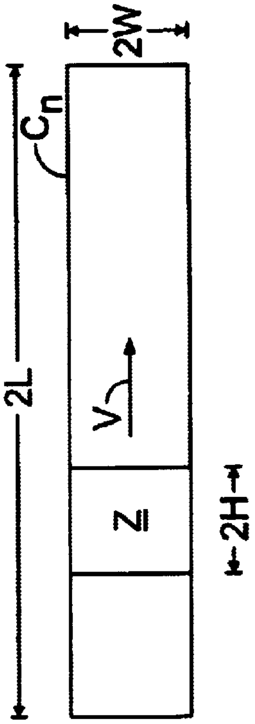
FIG. 4 is a schematic diagram of a corridor of a matrix.

As seen in FIG. 4, a rectangular, two-dimensional geo-wave corridor $C_n$ is depicted as having a width 2W. The length of the corridor, 2L, is derived partially from available mapping databases such as Rand McNally™, for example, and partially from calculations needed to contain the vehicle within the selected route with the desired tolerance.

Within geo-wave corridor $C_n$ there is depicted a wave, or zone Z, also having a width 2W, and having a length, or period, 2H. 2H may or may not be equal to 2 W, although usually 2H would be greater than 2W. Zone Z is propagated in time through geo-wave corridor $C_n$ in the direction indicated by wave velocity vector V. Propagation is conducted representationally in vehicle processing system 110 using suitable computations as described in greater detail below and corresponds to movement of an expectancy region for the vehicle containing the vehicle processing system 110. In other words, for a vehicle containing the vehicle processing system 110 and traveling along the travel route, there are established, representationally, prescribed corridors $C_n$ through which expectancy regions, or zones Z, are propagated. The vehicle is expected to remain within these propagating zones during its travel, and to send indications to remote server 120 whenever it fails to do so. Importantly, so long as the vehicle remains within the propagating zones, it need not send such indications, thereby conserving communications resources while at the same time being imminently within a known, relatively small and prescribed region. The site of this region, along with its propagation speeds depend on several factors, including terrain type and experiential-based variables, as detailed below. Additionally, when a vehicle is outside the zone, after reporting its zone "transgression," it does not need to report continued transgressions. Its reporting will then only need to be performed when it is back in the zone, or when the server interrogates the vehicle for position and status.

During operation, the vehicle processing system 110 further carries out, in real time, determinations of the location of the vehicle/vehicle processing system 110 at prescribed time intervals. Each such location determination is compared with a contemporaneous position of propagating zone Z, and particularly, with the region encompassed by the zone Z at the corresponding moment in time. If, as a result of the comparison, it is determined that the vehicle location is outside the region encompassed by the propagating zone Z, then a signal is sent wirelessly from the vehicle processing system 110 to the remote server notifying the server of same. If, on the other hand, it is determined that the vehicle location is within the region encompassed by the propagating zone Z, then no such signal is sent. In this manner, communication between the vehicle processing system and the remote server 120 is minimized, taking place on an "exception" basis, and thereby reducing the consumption of processing and communication resources associated with such communication. It will be appreciated that the benefits from such a reduction, for a fleet of a large number of vehicles, is cumulative and can result in considerable conservation of resources and reduction in costs of operation. Further, an accurate accounting of the location of the vehicle at all times is maintained, despite the reduction of communication overhead and costs. Thus notwithstanding the minimal communication, the server remains informed of the vehicle's whereabouts, and knows that the vehicle is in the zone Z bounded by 2W and 2H at the point defined by the route and the time into the route.

Figure 5:
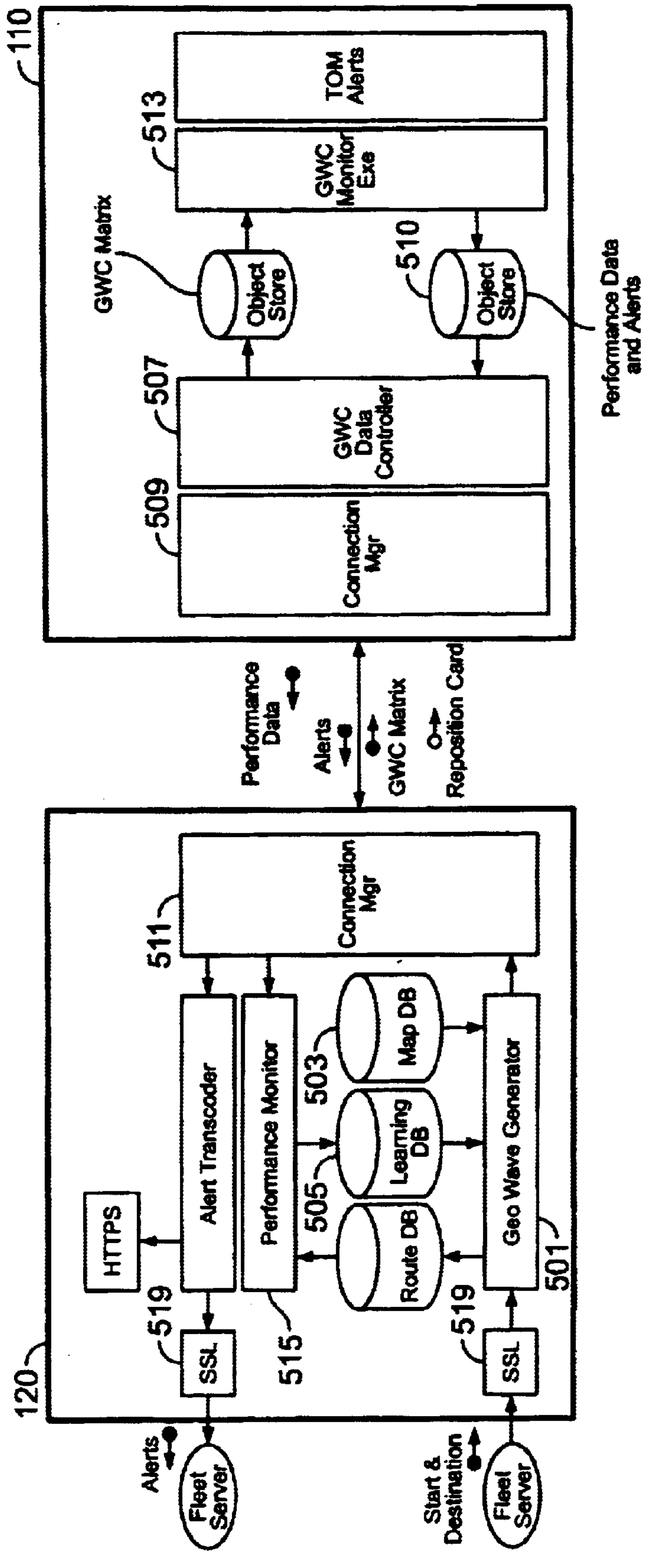
FIG. 5 is a block diagram of the various components associated with the vehicle processing system and remote server.

The operation of the invention is further explained with reference to the exemplary block diagram of FIG. 5, depicting various components which can be associated with vehicle processing unit 110 and remote server 120. These components may be physically discrete, or they may be simply processes dedicated to performing designated tasks. In either case, they may be integral with vehicle processing unit 110 or remote server 120, or they may be separate therefrom—that is, residing in or running on separate, discrete devices.

Geo-wave generator (GWG) 501 of remote server 120 receives travel route information relating to the start point and destination of the vehicle processing system 110 and associated vehicle. This information corresponds to points $P_1$ and $P_6$ of FIG. 3. GWG 501 uses these endpoints to construct the geo-wave matrix, including all intermediate points. Map information stored in database 503 is used for this purpose, and can be based on a commercially available data base, such that from Rand McNally™. The start and end points, along with some or all of the intermediate points, can be entered into the system in the form of latitude and longitude coordinates, or as specific addresses from which a process of "reverse geo coding" is performed to derive the latitude and longitude coordinates. "Geo coding" is a known term in the electronic navigation and mapping art, and refers to latitude and longitude coordinates and other information associated with designated geographical positions.

The number of intermediate points in a geo-wave matrix is a function of the length of the travel route and the curvature of the road in each segment, and the precision desired (size of W). Corridor length is defined by the length of the route that can be contained within 2W given a start point and a heading. The distance between points is variable, and can be provided by the commercial database relied upon. This distance is used as a measure of the length of each corridor $C_n$. The intermediate points can be derived directly from latitude/longitude coordinates provided by the database, or they can be derived from X,Y offset information provided by the database, as is common from some mapping databases. In the latter type of database, sequential points along a route are related to one another by X and Y offsets. For instance, a start point whose latitude and longitude coordinates are known, is used as benchmark for a second point, which is described as being X-meters east or west and Y meters north or south of the start point. A third point is then described as being X meters east or west of and Y meters north or south of the second point, and so on. For a three dimensional route, as for an aircraft, three offset points—X, Y, and Z—would be used: The information from such databases provides an indication of the road variation because it further includes shape points which are used in constructing a map, for example for display or printout. The number of these shape points is related to the road curvature. Moreover, some of these shape points themselves can be used as the intermediate points. In constructing intermediate points for the geo-wave matrix, points are generated in an attempt to reach a constant—somewhat straight—road curvature value, herein referred to as $C_{RV}$, where $R_v$ is the route variance derived from the mapping software associated with the mapping database. The algorithm for determining the number of intermediate points involves the reduction of route variance between intermediate points to the value $C_{RV}$. Offsets between points are generated, or eliminated, until the $R_v$ for each point, or $R_{vi}$ returned is within the $C_{RV}$. The following is an algorithm for generating N intermediate points, and is effectively a binary recursion procedure, with "MatrixNode" being a linked list, and N being the sum of the nodes in the linked list:

```
MatrixNode*DelineatePoint(GeoCode*pStart,, GeoCode*pEnd)
{
MatrixNode*pNode=CreateMidPoint(&sStart, &sEnd);
int iR;
if ( pNode )
{
    iR=GetRouteVariance(*pStart,*pNode);
    if ( iR > C_RV * 1.05)
      pStart->flink = DelineatePoint(pStart, pNode);
    else
      pStart -> flink = pNode;
      //No need to worry about the -5% point. Assume, prior 5% wasn't met.
      //Half way point is good enough.
      iR=Get RouteVariance(*pNode, *pEnd);
      if ( iR>C_RV * 1.05)
        pNode -> flink = DelineatePoint(*pNode, pEnd);
      else
        pNode -> flink = pEnd;
    }
    return(pNode);
}
```

Figure 8:
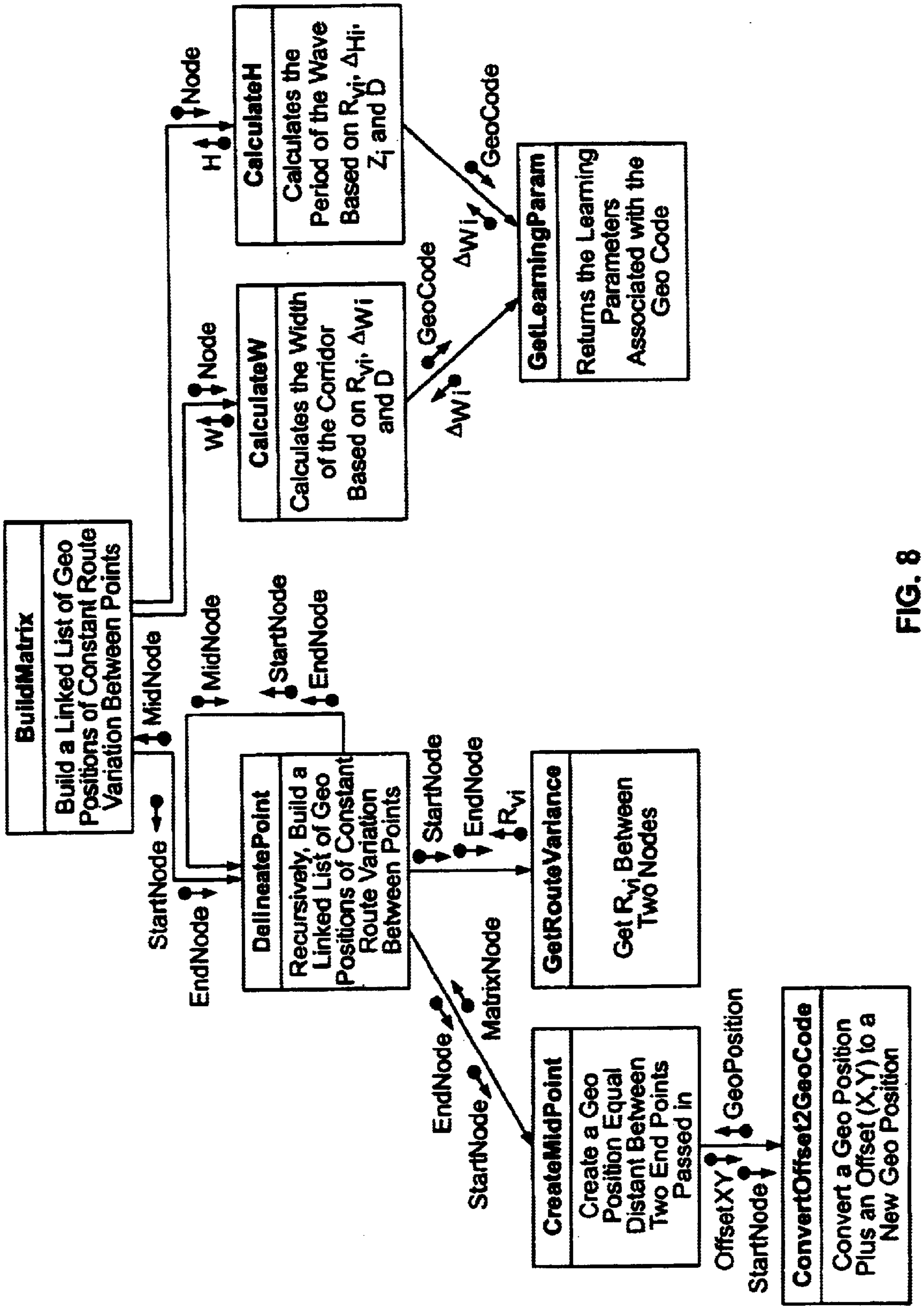
FIG. 8 is a block diagram depicting a geo-matrix construction process.

The matrix is exemplarily generated in accordance with the chart depicted in FIG. 8.

The X and Y coordinates for each node can be expressed in geo code coordinates (latitude/longitude) using a standard conversion algorithm.

Figure 10:
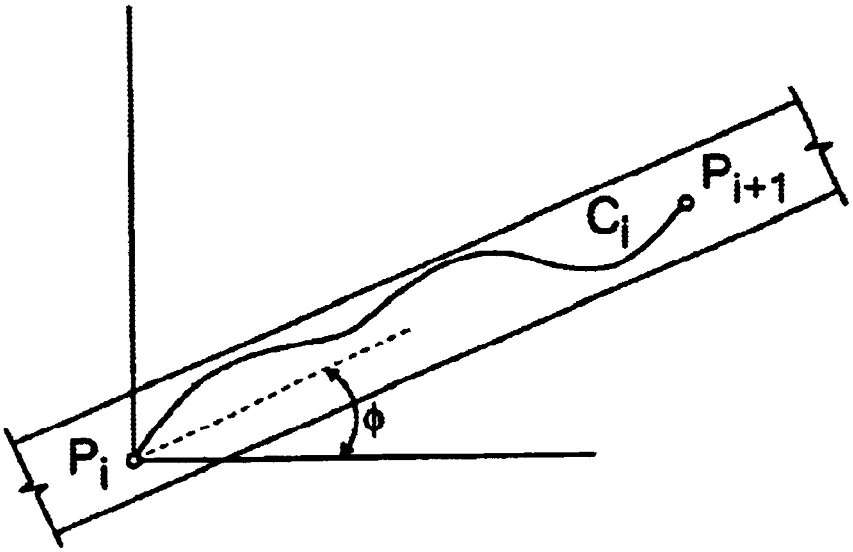
FIG. 10 is a schematic diagram showing details relating to the heading calculation.

Once the intermediate points are generated, a wave vector V is calculated for each corridor $C_n$. The vector represents the speed and direction (heading, relative to the equator) at which the wave, or zone Z, is to be propagated through the corridor, and is based on the distance between adjacent points, the location of these points, and the estimated travel time between them. This information can be furnished by the commercial mapping database, and the wave vector V can be readily determined therefrom by dividing the distance by the estimated travel time. The direction of propagation of vector V is determined from computing a heading, relative to the equator, for each wave or zone Z in each corridor $C_n$. Such a calculation is relatively simple, involving the coordinates of the start and end points for each corridor $C_n$. FIG. 10 shows the details relating to the heading $\phi$ between two points $P_i$ and $P_{i+1}$ having coordinates $X_1$, $Y_1$ and $X_2$, $Y_2$ for a corridor $C_i$.

Corridor width 2W is derived as a function of the road curvature $C_{RV}$, and of a learning parameter Δw, which is obtained from a pre-stored database 505 for points along that particular route. ΔW is a learned, experientially-based feedback parameter generated in a manner described in more detail below. Corridor width at a particular point $P_i$ is a function of the route variance at that point, expressed as $R_{vi}$, the learning parameter at that point, expressed as $\Delta W_i$, and the route speed $Z_i$ (determined by dividing the distance between the points by the estimated travel time). One example of a manipulation of a calculation of Wi could be:

$Wi=f(RV_i, \Delta W_i, Z_i)$ and where $$f(R_{Vi}, \Delta W_i, Z_i)=(C_{HR})(R_{V1})+(C_{H\Delta})(\Delta W_i)-(C_{HZ})(Z_i)+C_W$$

$C_{HX}$ and $C_w$ are constants.

This is a linear approach yielding acceptable results in most circumstances. However, in some situations more complex manipulations may be required, for example:

$$f(R_{Vi}, \Delta W_i, Z_i)=(C_{HR})(R_{V1})^{15}+(C_{H\Delta})(\Delta W_i)-(C_{HZ}(Z_i)^{0.75}+C_W$$

The general relationship between the variables involved in determining the width 2W of the corridors $C_n$ is as follows:

| Input Variable | Affect on W |
|---|---|
| R↑ | W↑ |
| R↓ | W↓ |
| Z↑ | W↓ |
| Z↓ | W↑ |
| Δ↑ | W↑ |
| Δ↓ | W↓ |

The length of the wave, or zone Z, also referred to as the wave period (2H), is a function of the road curvature $C_{Rv}$, a second pre-stored parameter Δh from database 505, the route speed Z, and the distance between a current point and a next point. Δh is also a learned, experientially-based feedback parameter. The generation of Δh is described in greater detail below. The following equation can be used, as an example of a linear model, to determine the period $H_i$ for each point, although it will be appreciated that other, non-linear models can also be used:

$$H_i32\ f(R_{vi}, \Delta_{Hi}, Z_i, D_{i,1+1})$$

where $f(R_{vi},\Delta_{Hi}, Z_i, D_{i,1+1})=(C_{HR})(R_{vi})+(C_{w\Delta})(\Delta_{wi})-(C_{Hz})(Z_i)(C_{HD})(D_{i,1_{13}\ 1}+C_H\ C_{WX}$ and $C_W$ is a constant.

The general relationship between the variables involved in determining the H for the wave period is as follows:

| Input Variable | Affect on H |
|---|---|
| R↑ | H↑ |
| R↓ | H↓ |
| Z↑ | H↑ |

-continued

| Input Variable | Affect on H |
|---|---|
| Z↓ | H↓ |
| Δ↑ | H↓ |
| Δ↓ | H↑ |
| D↑ | H↑ |
| D↓ | H↓ |

It will be appreciated that the wave period can be determined in the same manner regardless of the shape of the wave, or zone Z. Specifically, while depicted as rectangular in shape, it is possible that other shapes, such as ellipses or modified ellipses or ovals, can be used. The period of such waves would correspond to the time/distance between the leading and trailing edges/points of the wave, or zone.

Figure 9:
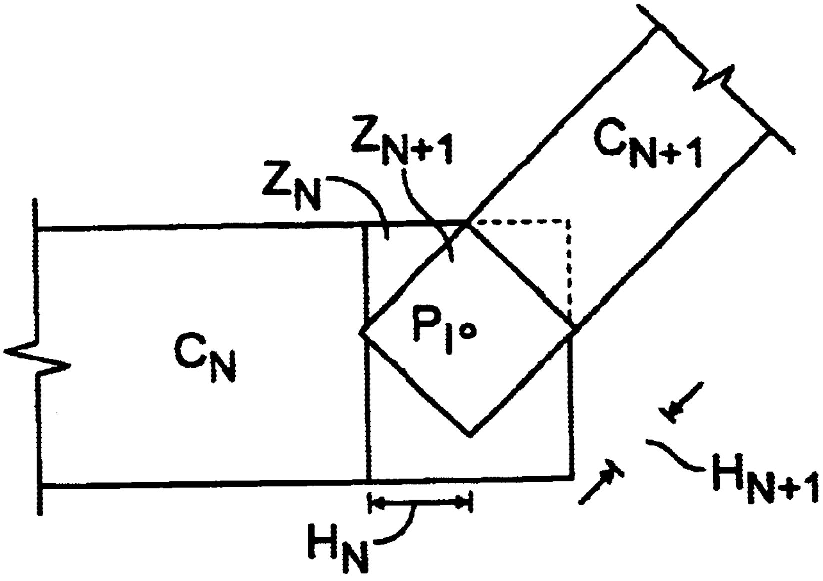
FIG. 9 is a schematic diagram of the intersection of two corridors $C_n$.

In constructing the corridors $C_n$, special rules apply with regard to the juncture of two corridors. The vehicle processing system 110 applies these special rules in order to prevent a gap in the information regarding to its whereabouts. With reference to FIG. 9, it can be seen that a point $P_1$ is encompassed by two corridors, $C_N$ and $C_{N+1}$, each of which includes a respective wave $Z_N$ and $Z_{N+1}$. During travel, vehicle processing system 110 assumes rules for mapping both of these waves $Z_N$ and $Z_{N+1}$. Such an inclusion zone which includes distances $H_N$ and $H_{N+1}$ on both sides of point $P_1$ prevents any gap of knowledge regarding its position. The inclusion zone is the "ORing" of the area bounded $Z_n$ and $Z_{n+1}$.

After the geo-wave matrix is determined and received by vehicle processing system 110, monitoring of the vehicle location on the vehicle processing system can begin. Monitoring is effected by monitor 510 through a dedicated process which checks the current position of the vehicle preferably about two times per second. This effectively creates an error envelope of approximately 15.2 meters for a vehicle traveling at 110 kph. An error of this magnitude is acceptable considering the resolution of current GPS is approximately 10 meters.

The monitoring process monitors the current position of the vehicle and validates its inclusion within the zone Z defined by the wave period 2H and corridor width 2W at a corresponding point in time. It will be appreciated that the parameters W and H are taken from the center of the zone Z to the corresponding edges of the zone. As discussed above (see FIG. 9) with respect to inclusion zone at the juncture of two points $P_i$, when the vehicle processing system 110 reaches a point between two corridors $C_n$, it must increase the inclusion zone as "OR" operation of the two zones corresponding to the two corridors. The processing system 110 thus generates another thread associated with the new corridor $C_n$ when it comes within H of the current position, with each thread monitoring its own boundaries. A central decision function evaluates the inclusion/exclusion outputs of each thread and effectively sets an alert if the first thread signals an alert AND the second thread signals an alert. When the vehicle processing system 110 has moved past the H of the zone associated with the first corridor $C_n$, the first thread exits and monitoring is only performed on the second thread. Of course, if there are more than two corridors $C_n$ clustered together, more than two threads can be spawned at the same time, in a simple extension of the above principle.

The learning parameters Δh and ΔW are generated by performance monitor 515 in server 120. Performance monitor 515 provides a feedback mechanism to improve the wave period 2H and the corridor width 2W over time, with the aim of minimizing false alerts due to variations in the road conditions. One way of reducing false alerts is to increase the "inclusion" zone specified by the wave period 2H and the corridor width 2W. However, increasing wave period increases the uncertainty in knowing the vehicle's exact position and arrival time, while increasing the corridor height allows the vehicle to deviate from the route for a loner period of time before detection.

Performance monitoring is implemented as a first order linear filter. For wave period (2H), the inputs are the deviation from dead center of the wave, or zone Z, at the end point. For corridor width (2W), the inputs are the number of alerts generated on a route that was not re-centered. Thus system performance is improved by adaptation to historical data, such that generation of false "left route" alerts and false "behind schedule" or "ahead of schedule" alerts is minimized, and such that route deviation tolerance (delay to report a corridor $C_n$ violation) is minimized, and estimated delivery "window" times, associated with the arrival of the vehicle at a particular location, are decreased.

During operation, when a lookup of a learning parameter Δh or ΔW is requested, exact geo code position matches are not required. The learning parameters associated with the closest geo code position can be returned. When a feedback update occurs, the given learning parameters Δh and ΔW can be used as the original (for the new position) and any error update applied to that parameter.

For wave period, the learning factor is:

$$\Delta_{Hi}(\text{new})=\beta_{\Delta H}\Delta_{Hi}(\text{old})+(1-\beta_{\Delta H})(\text{Distance from center of wave at end point})\ 0\leqq\beta_{\Delta H}\leqq 1$$

For corridor height, the learning factor is:

$$\Delta_{Wi}(\text{new})=\beta_{\Delta W}\Delta_{Wi}(\text{old})+(1-\beta_{\Delta W})(\text{number of alerts generated})\ 0\leqq\beta_{\Delta W}\leqq 1$$

As seen from FIG. 5, the remote server 120 can be in communication with other systems or devices, such as a customer's fleet management site, or with a proprietary system database for posting to a system web server which can be accessed by clients through an HTML browser. Alerts are sent to these other systems through a transcoder 517. Data can be transmitted in an XML delimited tag format over an SSL (Secure Sockets Layer) link 519. SSL is a standardized protocol used to encrypt information and to send or receive the encrypted information over the Internet.

Figure 7:
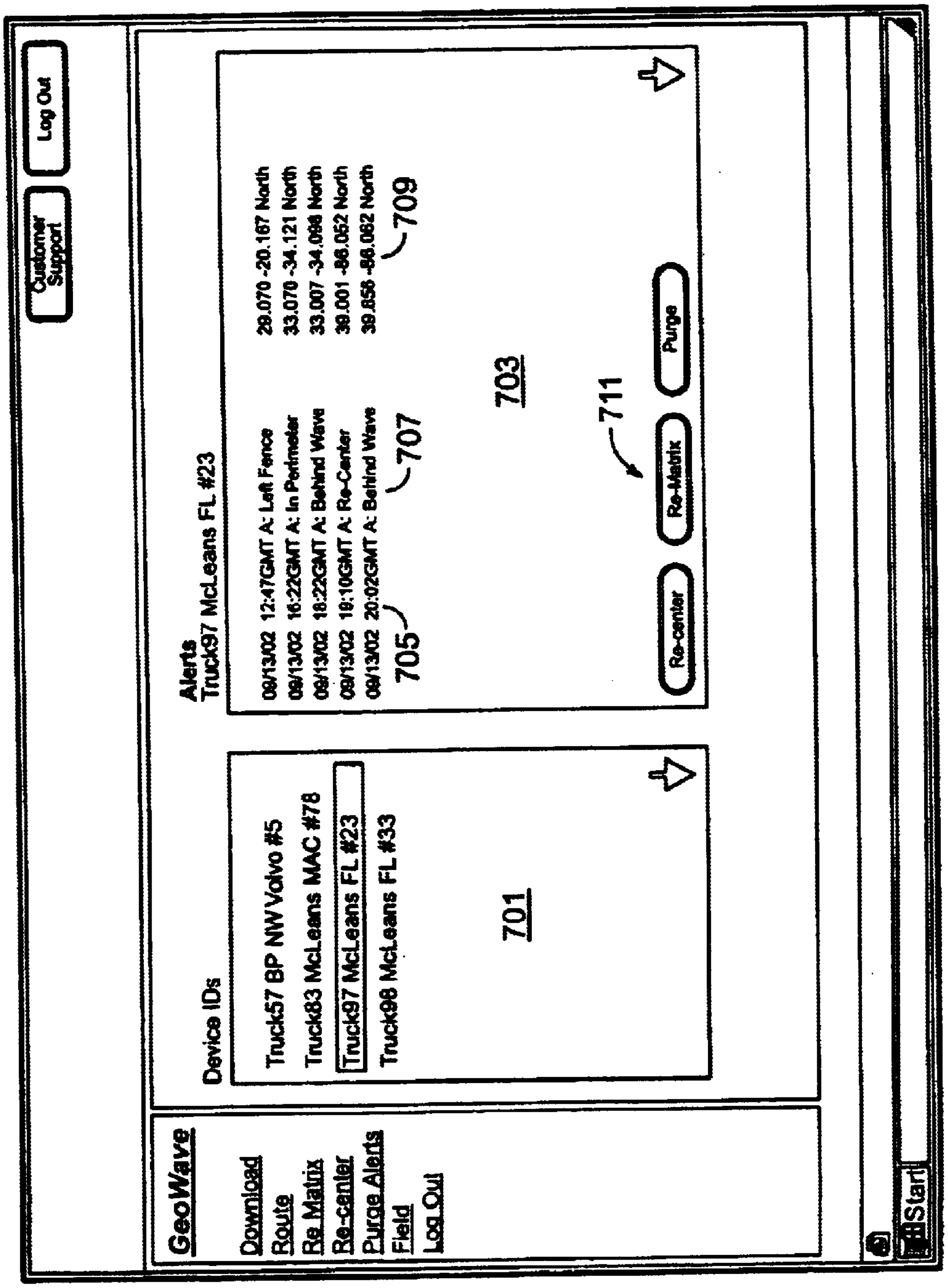
FIG. 7 is an exemplary display panel associated with a fleet manager site.

The alerts are in the form of messages indicating the status of the vehicle processing system 110 and associated vehicle. FIG. 7 illustrates a screen display at a fleet manager site, for example as would be displayed by a web browser accessing server 120 from a client location. It is contemplated that the system of the invention can monitor more than one fleet of vehicles, with each fleet being associated with a specific customer of the system. Accordingly, an authentication mechanism can be provided to ensure that a particular client can only view the status of its own fleet of vehicles. Generally, as seen from FIG. 7, a list of vehicles for a particular fleet is listed on the left, at 701. The viewer can select, through an associated input device such as a mouse (not show), a particular vehicle to view in more detail. On the right-hand side (703), details pertaining to the particular vehicle selected are displayed, for example indicating the time of an event (705), the nature of the event (707)—for example, the vehicle left the zone Z, or "fence," and the coordinates of the position at which the event took place (709). Options are presented to the user, at 711, permitting the user to perform a recenter operation, a re-matrix operation, or a purge operation. A modification to alerts could include allowing the vehicle to "fall behind" the wave if its delivery time is sufficiently far in advance that a break taken by the vehicle will not impact the delivery schedule. In such a case, the server could suspend "out of wave" notifications until the break impacted the delivery schedule. If the vehicle resumes the route within a time sufficient to meet the delivery load, the server automatically "recenters" the wave around the vehicle. This feature is used for vehicles that are permitted stops along the route. Other vehicles, such as those carrying high value or hazardous loads may not be permitted stops and would not make use of this feature.

As mentioned above, once the geo-wave matrix is calculated, it is downloaded from remote server 120 to the vehicle processing system 110, preferably using wireless transmission via a cellular system, or via a wireless network standard such as 802.11 (Hi-Wi) at the loading facility. The matrix is packetized to facilitate management and control of the transmission in the manner commonly applied for network data transmissions. The matrix is received by data controller 507, and stored in object store 508. Data controller 507 is further responsible for receiving and forwarding "re-center" and "start" commands to monitor 513. The matrix is forwarded to data controller 507 via the connection manager 509. Object store module 508 is used to store objects associated with the matrix.

Data controller 507 supports the geo-wave matrix as a main message, and also supports "start" and "reset" messages contained in object store module 510 and transmitted to the vehicle processing system 110. The start message specifies a start time in GMT (Greenwich Mean Time) indicating when the monitor 513 needs to begin monitoring its position in relationship to the propagating zone Z moving through the corridor $C_n$. Connection managers 509 and 511 establish and manage the connection between vehicle processing system 110 and server 120. The reset message is a message received from the remote server 120 that requests system "re-centering" within the wave, or zone Z. This message is typically sent after an alert has been uploaded from the vehicle processing system 110 informing the remote server 120 that it is outside the wave boundaries, or for example if the driver decides to rest.

Other contemplated messages between the vehicle processing system 110 and remote server 120 include, but are not limited to, "alert" messages and a "point feedback" message. The alert messages may be transmitted from the vehicle processing system 110 to the remote server 120 whenever the vehicle processing system strays outside the wave, or zone Z boundaries, and/or the corridor $C_n$ boundaries. Alert messages such as "left route" are associated with these transgressions. Other alert messages include, but are not limited to, "behind schedule" and "ahead of schedule" alerts. The point feedback message is transmitted from the vehicle processing system 110 to the remote server 120. Feedback messages relate to the ΔH and ΔW parameters described above. For example, each time a point $P_n$ is reached at the end of a corridor $C_n$, the error in the actual position from the center of the wave or zone Z is determined by system 110 and sent to the server 120. This information is associated with the learning ability of the server to correctly predict a wave velocity that minimizes alerts generated because of incorrect wave velocity. However, if a re-center command has been sent in to the system 110 in a particular corridor $C_n$, feedback is ignored and not reported to the server 120.

During operation, monitor 513, responding to the start message, begins monitoring the current position of the vehicle processing system 110, based on GPS signals from device 230 (FIG. 2). Periodic position queries are made, resulting in the generation of position information at predetermined intervals, the number and/or period of which may be a function of the travel route and expected travel speed, among other factors. During this monitoring, the wave or zone Z is representationally propagated, at velocity V, through the constructed corridors $C_n$. The position information derived at each point in time is then compared with the contemporaneous position of the propagating zone Z, and more specifically, with the geographical region represented by the zone.

If, for a particular point in time, it is found that the position of the vehicle processing system 110 lies outside the geographical region represented by the zone Z, the alert message is sent from the system 110 to the remote server 120, indicating that the vehicle has moved past the wave, or has fallen behind the wave, or has otherwise transgressed the boundaries of the wave. Preferably, only one alert message should be sent per excursion outside the zone Z.

Figure 6:
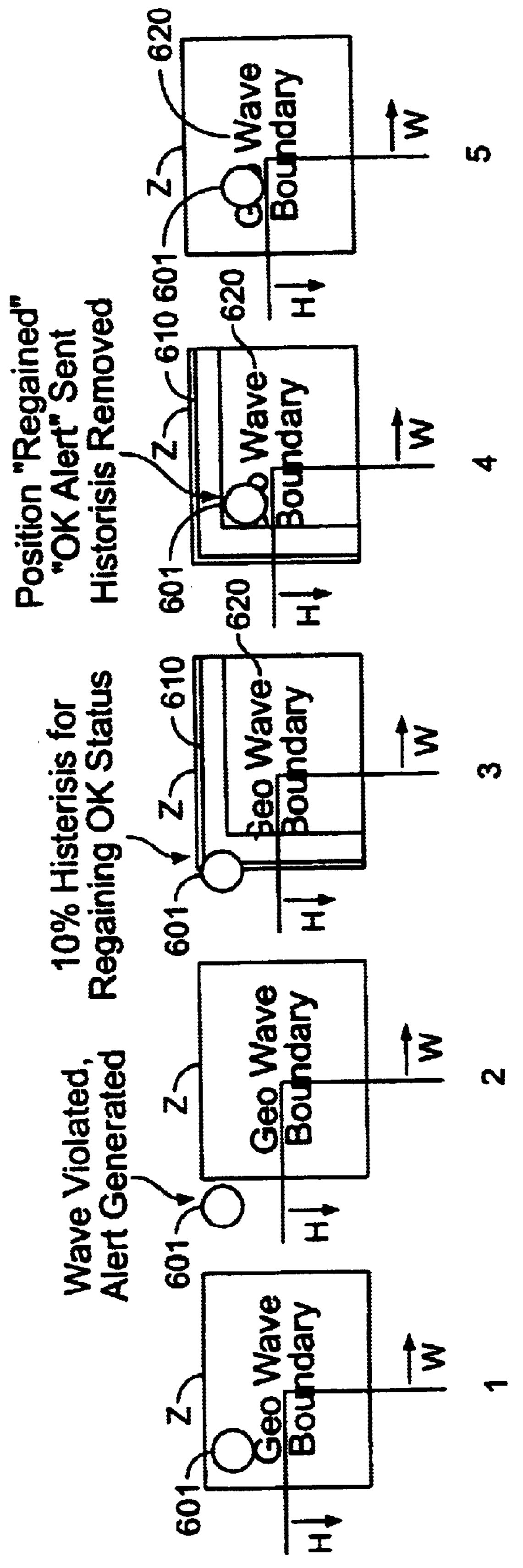
FIG. 6 is schematic diagram illustrating hysteresis principle associated with a zone Z.

Eventually, when the zone Z is regained, a new message—"back-on-schedule"—is sent from the system 110 to the server 120 indicating same. To avoid unnecessary repetition of alert messages, a hysteresis value for the zone Z is computed when the zone is violated. The hysteresis value is about 10% of the zone size, and is illustrated in FIG. 6. Hence, when the position (601) of the system 110 is first found to be outside the zone Z, the alert message is sent to server 120. At the next point in time, if the position of the system is still not within zone Z, or is still less than 10% into the zone Z (that is, in the shaded region 610 in FIG. 6), an alert signal is not sent again. This situation continues until a position measurement is yielded indicating that the system 110 is back within the remaining 90% of the zone Z (unshaded portion 620 in FIG. 6). At that point, a back-on-schedule message is sent from the system 110 to the server 120, and the process then continues as described. In some situations, when significant deviations have occurred, the server 120 can send a new matrix to the vehicle processing system 110 so that the monitoring process can begin anew, using a new route.

Remote sever 120 can also send the re-center message to the system 110, said message causing the controller 507 to center the geographical region represented by the wave or zone Z around the current position of the system, and then immediately begin propagating the wave along the corridor $C_n$ at velocity V.

Alert messages are transmitted through the data controller 509, and are placed in a high priority message queue, allowing for an immediate data transmission.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method for providing a remote server with information regarding vehicle location relative to a travel route, the method comprising:

defining a zone whose location varies in time relative to the travel route;

determining the location of the vehicle at multiple points in time;

comparing, in the vehicle, the location of the vehicle at at least one of the multiple points in time with a contemporaneous location of the zone;

generating, in the vehicle, a notification signal when the comparison indicates that the vehicle location is outside the zone; and transmitting the notification signal from the vehicle to the remote server such that the remote server is notified by said transmitted notifiation signal that the vehicle is outside the zone.

2. The method of claim 1, wherein the location of the vehicle is determined onboard the vehicle.

3. The method of claim 1, wherein the vehicle is an aircraft whose location is monitored during flight.

4. The method of claim 3, wherein the location information includes altitude information.

5. The method of claim 1, wherein one or both the location and the size of the zone varies as a function of a geographical region associated with the zone.

6. The method of claim 1, wherein one or both the location and the size of the zone varies as a function of one or more learning parameters associated with the travel route.

7. The method of claim 1, further comprising adapting to historical data so as to minimize false notification signal transmissions.

8. The method of claim 1, further comprising adapting to historical data so as to minimize route deviation tolerance.

9. The method of claim 1, wherein the notification signal includes "behind schedule" and "ahead of schedule" alerts, and wherein system performance is improved by adaptation to historical data so as to minimize false "behind schedule" and "ahead of schedule" alerts.

10. A system for providing information regarding vehicle location relative to a travel route, the system comprising:

a server for generating a matrix associated with the travel route; and a processing system disposed in the vehicle remotely, from the server, the processing system generating position information and comparing the position information with the position of a zone whose location varies over time, the processing system forwarding an alert to the server when the position information indicates that the position of the processing system is outside the zone such that the server is notified by said forwarded alert that the vehicle is outside the zone.

11. The system of claim 10, wherein the matrix is generated by the server and forwarded to the processing system.

12. The system of claim 11, wherein the vehicle is an aircraft, and wherein the position information includes altitude information.

13. The system of claim 10, wherein the matrix includes one or more corridors corresponding to a geographical region associated with the travel route and through which associated zones are representationally propagated.

14. The system of claim 13, wherein the propagation of each zone in an associated corridor is a function of the geographical region corresponding to the corridor.

15. The system of claim 13, wherein the propagation of each zone in an associated corridor is a function of one or more learning parameters corresponding to the corridor.

16. The system of claim 10, wherein system performance is improved by adaptation to historical data so as to minimize false alerts.

17. The system of claim 10, wherein system performance is improved by adaptation to historical data so as to minimize route deviation tolerance.

18. The system of claim 10, wherein the processing system further generates and sends to the server "behind schedule" and "ahead of schedule" alerts, and wherein system performance is improved by adaptation to historical data so as to minimize false "behind schedule" and "ahead of schedule" alerts.

19. A system for tracking one or more fleets of vehicles each having one or more vehicles, the system comprising:

at least one server for generating a geo-matrix associated with each fleet; and a set of vehicle processing systems associated with each fleet, each vehicle processing system being disposed in a vehicle of the fleet and generating position information relating to the position of said vehicle at predetermined time intervals relative to a propagating zone defined by the geo-matrix associated with the fleet, the vehicle processing system notifying the server when the vehicle is determined to lie outside a geographical region associated with the propagating zone by forwarding "a left route" alert to the server indicative of same.

20. The system of claim 19, wherein the vehicles are aircraft, and the position information includes altitude information.

21. The system of claim 19, wherein the server is connected to the Internet such that fleet information can be obtained online.

22. The system of claim 21, wherein the fleet information is specific to a fleet client.

23. The system of claim 22, wherein the fleet client is authenticated before release of the fleet information.

24. The system of claim 19, wherein the vehicle can be remotely disabled.

25. The system of claim 19, wherein system performance is improved by adaptation to historical data so as to minimize false "left route" alerts.

26. The system of claim 19, wherein system performance is improved by adaptation to historical data so as to minimize route deviation tolerance.

27. The system of claim 19, wherein notifying the server further comprises sending "behind schedule" and "ahead of schedule" alerts, and wherein system performance is improved by adaptation to historical data so as to minimized false "behind schedule" and "ahead of schedule" alerts.

28. The system of claim 19, wherein system performance is improved by adaptation to historical data so as to decrease an estimated delivery window associated with the arrival of the vehicle at a specified location.

29. A system for tracking one or more fleets of vehicles each having one or more vehicles, the system comprising:

at least one server for generating a geo-matrix associated with each fleet; and a set of vehicle processing systems associated with each fleet, each vehicle processing system being disposed in a vehicle of the fleet and generating position information relating to the position of said vehicle at predetermined time intervals relative to a propagating zone defined by the geo-matrix associated with the fleet, the vehicle processing system notifying the server when the vehicle is determined to lie outside a geographical region associated with the propagating zone by forwarding a "left route" alert to the server indicative of same, wherein system performance is improved by adaptation to historical data so as to minimize false "left route" alerts.

30. A system for tracking one or more fleets of vehicles each having one or more vehicles, the system comprising:

at least one server for generating a geo-matrix associated with each fleet; and a set of vehicle processing systems associated with each fleet, each vehicle processing system being disposed in a vehicle of the fleet and generating position information relating to the position of said vehicle at predetermined time intervals relative to a propagating zone defined by the geo-matrix associated with the fleet, the vehicle processing system notifying the server when the vehicle is determined to lie outside a geographical region associated with the propagating zone by forwarding one or more of "left route", "behind schedule" and "ahead of schedule" alerts, wherein system performance is improved by adaptation to historical data so as to minimize false "behind schedule" and "ahead of schedule" alerts.

31. A system for tracking one or more fleets of vehicles each having one or more vehicles, the system comprising:

at least one server for generating a geo-matrix associated with each fleet; and a set of vehicle processing systems associated with each fleet, each vehicle processing system being disposed in a vehicle of the fleet and generating position information relating to the position of said vehicle at predetermined time intervals relative to a propagating zone defined by the geo-matrix associated with the fleet, the vehicle processing system notifying the server when the vehicle is determined to lie outside a geographical region associated with the propagating zone by forwarding a "left route" alert to the server indicative of same, wherein system performance is improved by adaptation to historical data so as to decrease an estimated delivery window associated with the arrival of the vehicle at a specified location.

* * * * *

UNITED STATES PATENT AND TRADEMARK OFFICE

CERTIFICATE OF CORRECTION

PATENT NO. : 6,832,153 B2
DATED : December 14, 2004
INVENTOR(S) : Peter A. Thayer et al.

It is certified that error appears in the above-identified patent and that said Letters Patent is hereby corrected as shown below:

Column 7,
Line 55, replace “32” with -- = --.

Line 57, repalce “$D_{i,1_{13}1}$” with -- $D_{i,l\_1}$ ) --.

Line 57, after “$C_H$” insert a line break.

Signed and Sealed this

Twelfth Day of July, 2005

JON W. DUDAS
*Director of the United States Patent and Trademark Office*